US006551748B1

(12) United States Patent
Atwater et al.

(10) Patent No.: US 6,551,748 B1
(45) Date of Patent: Apr. 22, 2003

(54) PREVENTION OF POLYMERIZATION IN LI/MNO$_2$ ORGANIC ELECTROLYTE ELECTROCHEMICAL SYSTEMS

(75) Inventors: Terrill B. Atwater, North Plainfield, NJ (US); Louis E. Branovich, Howell, NJ (US); Anthony G. Pellegrino, Middletown, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/606,714

(22) Filed: Jun. 29, 2000

(51) Int. Cl.$^7$ ............................................... H01M 10/40
(52) U.S. Cl. ........................ 429/341; 429/224; 429/324
(58) Field of Search ................................. 429/188, 203, 429/324, 199, 341, 224

(56) References Cited

U.S. PATENT DOCUMENTS 3,769,092 A * 10/1973 Dechenaux ................. 429/335
6,143,449 A * 11/2000 Kita et al. ................ 429/231.4
6,145,280 A * 11/2000 Daroux et al. ............. 29/623.2

FOREIGN PATENT DOCUMENTS

| JP | 63 110562 | * 5/1988 |
| JP | 05 190204 | * 7/1993 |
| JP | 08 321313 | * 12/1996 |

* cited by examiner

*Primary Examiner*—Carol Chaney
(74) *Attorney, Agent, or Firm*—Michael Zelenka; George B. Tereschuk

(57) ABSTRACT

This invention provides a number of phosphorous and arsenic reducing agents to eliminate gas formation and polymerization of Li/MnO$_2$ and other lithium cells caused by the formation of dialcohol. The phosphorous reducing agents when added to the Li/MnO$_2$ and other lithium battery electrolytes cause the phosphorous compound and alcohol to react and produce ether and orthophosphorous acid, which prevents gas formation and the polymerization of Li/MnO$_2$ cells caused by the formation of dialcohol. The preferred reducing agent is phosphoric acid tri-ester. The arsenic reducing agents when added to the Li/MnO$_2$ and other lithium battery electrolytes cause the arsenic compound and alcohol to react and produce ether and orthoarsenic acid, which also prevents gas formation and the polymerization of Li/MnO$_2$ cells caused by the formation of dialcohol. Similar reactions and effects are also achieved with numerous other useful phosphorous and arsenic compounds that react with alcohol to produce ether and related acid compounds.

13 Claims, 12 Drawing Sheets

TABLE 1

| CHEMICAL NAME | STRUCTURE | CHEMICAL NAME | PERIODIC STRUCTURE |
|---|---|---|---|
| DIOXOLENE | $\begin{array}{c} CH_2 \\ O \diagup \diagdown O \\ H_2C - H_2C \end{array}$ | DIMETHOXYETHANE | $\begin{array}{cc} H_2C-O-CH_3 \\ \phantom{xx}\vert \\ H_2C-O-CH_3 \end{array}$ |
| PROPYLENE CARBONATE | $\begin{array}{c} C=O \\ O \diagup \diagdown O \\ H_2C - HC - CH_3 \end{array}$ | TETRAHYDRAFURAN | $\begin{array}{c} O \\ H_2C \diagup \diagdown H_2C \\ H_2C - H_2C \end{array}$ |

TABLE 2

| SOLVENT | ADDITIONAL CELL CONDITIONS | | | <25 ppm H$_2$O in Solvent | 0.1% H$_2$O in Solvent | Solvent Exposed to Ambient Air 7 Days [a] | Cathode Exposed to Ambient Air 7 Days | Solvent & Cathode Exposed to Ambient Air |
| --- | --- | --- | --- | --- | --- | --- | --- | --- |
| | Li | MnO$_2$ CATHODE | EXTERNAL VOLTAGE (3.6 V) | | | | | |
| PC:DME:Diox (1:1:1) | | | | - | - | - | N/A | N/A |
| | X | | | H$_2$[b] | H$_2$, CO$_2$[b] | H$_2$, CO$_2$[b] | N/A | N/A |
| | | X | | H$_2$[b], CO$_2$[b] | 1.2/1 [c] | 1.8/1 [c], Org | 1/1 [c] | 1.9/1 [c], Org. |
| | X | X | | H$_2$[b] | 9.0/1 [c] | 7.0/1 [c] | 1.2/1 [c] | 3.2/1 [c] |
| | | | X | - | 1.1/1 [c], Org. | 2.2/1 [c], Org. | N/A | N/A |
| PC:DME:THF (1:1:1) | | | | - | - | - | N/A | N/A |
| | X | | | H$_2$[b] | H$_2$ | H$_2$, CO$_2$[b] | N/A | N/A |
| | | X | | - | - | - | - | - |
| | X | X | | H$_2$[b] | H$_2$ | H$_2$, CO$_2$[b] | H$_2$[b] | H$_2$ |
| | | | X | - | Org. | H$_2$, Org. | N/A | N/A |
| PC | | | | - | - | - | N/A | N/A |
| | X | | | H$_2$[b] | H$_2$ | H$_2$ | N/A | N/A |
| | | X | | - | - | - | - | - |
| | X | X | | H$_2$[b] | H$_2$ | H$_2$ | H$_2$[b] | H$_2$ |
| | | | X | H$_2$[b], CO$_2$[b] | H$_2$[b], CO$_2$[b] | H$_2$[b], CO$_2$[b] | N/A | N/A |
| DME | | | | - | - | - | N/A | N/A |
| | X | | | H$_2$[b] | H$_2$ | H$_2$ | N/A | N/A |
| | | X | | - | - | Org. | - | Org. |
| | X | X | | H$_2$[b] | H$_2$ | H$_2$ | H$_2$[b] | H$_2$, Org. |
| | | | X | - | Org. | H$_2$, Org | N/A | N/A |
| Diox | | | | - | - | - | N/A | N/A |
| | X | | | H$_2$[b] | H$_2$, CO$_2$[b] | H$_2$, CO$_2$[b] | N/A | N/A |
| | | X | | - | 1.3/1 [c] | 1.9/1 [c] | 1/1 | 2.1/1 [c] |
| | X | X | | H$_2$[b] | 5.2/1 [c] | 5.5/1 [c], Org. | 1.1/1 | 3.7/1 [c], Org. |
| | | | X | H$_2$[b], CO$_2$[b] | 1.2/1 [c] | 2.0/1 [c], Org. | N/A | N/A |
| THF | | | | - | - | - | N/A | N/A |
| | X | | | H$_2$[b] | H$_2$ | H$_2$ | N/A | N/A |
| | | X | | - | - | - | - | - |
| | X | X | | H$_2$[b] | H$_2$ | H$_2$ | H$_2$[b] | H$_2$ |
| | | | X | - | Org. | Org. | N/A | N/A | notes:
a: Positive test result for the presence of peroxides and 1000 to 3000 ppm H$_2$O in solvent
b: Trace amounts detected in gas above cell
c: Ratio of H$_2$O to CO$_2$ detected in gas above cell
Org.: Trace amounts of light organic compounds detected in gas above cell

TABLE 3

| SOLVENT | ADDITIONAL Li | CELL $MnO_2$ CATHODE | CONDITIONS EXTERNAL VOLTAGE (3.6 V) | <25 ppm $H_2O$ in Solvent | 0.1% $H_2O$ in Solvent | Solvent Exposed to Ambient Air 7 Days[a] | Cathode Exposed to Ambient Air 7 Days | Solvent & Cathode Exposed to Ambient Air |
|---|---|---|---|---|---|---|---|---|
| PC:DME:Diox (1:1:1) | | | | - | - | - | N/A | N/A |
| | X | | | $H_2$[b] | $H_2 \cdot CO_2$[b] | $H_2 \cdot CO_2$[b] | N/A | N/A |
| | | X | | $H_2$[b], $CO_2$[b] | 0.8/1[c] | 1.5/1[c], Org | 0.9/1[c], Org | 1.8/1[c] Org. |
| 1 M $LiAsF_6$ | X | X | | $H_2$[b] | 9.0/1[c] | 7.0/1[c] | 1.2/1[c], Org | 3.0/1[c] Org. |
| | | | X[d] | - | 1.1/1[c], Org. | 2.2/1[c], Org. | N/A | N/A |
| PC:DME:THF (1:1:1) | | | | - | - | - | N/A | N/A |
| | X | | | $H_2$[b] | $H_2$ | $H_2 \cdot CO_2$[b] | N/A | N/A |
| | | X | | - | $H_2$[b],$CO_2$,Org. | $H_2$[b],$CO_2$,Org. | $H_2$[b],$CO_2$,Org. | $H_2$[b],$CO_2$,Org. |
| 1 M $LiAsF_6$ | X | X | | $H_2$[b] | $H_2$ | $H_2 \cdot CO_2$[b] | 0.5/1[c], Org | 2.2/1[c], Org |
| | | | X[d] | - | Org. | $H_2$, Org. | N/A | N/A |
| PC | | | | - | - | - | N/A | N/A |
| | X | | | $H_2$[b] | $H_2$ | $H_2$ | N/A | N/A |
| | | X | | - | $H_2$[b],$CO_2$,Org. | $H_2$[b],$CO_2$,Org. | $H_2$[b],$CO_2$,Org. | $H_2$[b],$CO_2$,Org. |
| | X | X | | $H_2$[b] | $H_2$ | $H_2$ | 0.3/1[c], Org | 1.8/1[c], Org. |
| | | | X[d] | $H_2$[b], $CO_2$[b] | $H_2$[b], $CO_2$[b] | $H_2$[b], $CO_2$[b] | N/A | N/A |
| DME | | | | - | - | - | N/A | N/A |
| | X | | | $H_2$[b] | $H_2$ | $H_2$ | N/A | N/A |
| | | X | | - | - | Org. | - | Org. |
| | X | X | | $H_2$[b] | $H_2$ | $H_2$ | $H_2$[b] | $H_2$, Org. |
| | | | X[d] | - | Org. | $H_2$, Org | N/A | N/A |
| Diox | | | | - | - | - | N/A | N/A |
| | X | | | $H_2$[b] | $H_2 \cdot CO_2$[b] | $H_2 \cdot CO_2$[b] | N/A | N/A |
| | | X | | - | 1.3/1[c] | 1.9/1[c] | 1/1 | 2.1/1[c] |
| | X | X | | $H_2$[b] | 5.2/1[c] | 5.5/1[c], Org. | 1.1/1 | 3.7/1[c], Org. |
| | | | X[d] | $H_2$[b], $CO_2$[b] | 1.2/1[c] | 2.0/1[c], Org. | N/A | N/A |
| THF | | | | - | - | - | N/A | N/A |
| | X | | | $H_2$[b] | $H_2$ | $H_2$ | N/A | N/A |
| | | X | | - | - | - | - | - |
| | X | X | | $H_2$[b] | $H_2$ | $H_2$ | $H_2$[b] | $H_2$ |
| | | | X[d] | - | Org. | Org. | N/A | N/A | notes:

a: Positive test result for the presence of peroxides and 1000 to 3000 ppm $H_2O$ in solvent b: Trace amounts detected in gas above cell c: Ratio of $H_2$ to $CO_2$ detected in gas above cell d: Storage time 2 weeks Org.: Trace amounts of light organic compounds detected in gas above cell

TABLE 4

| SOLVENT | ADDITIONAL CELL CONDITIONS Li | ADDITIONAL CELL CONDITIONS $MnO_2$ CATHODE | ADDITIONAL CELL CONDITIONS EXTERNAL VOLTAGE (3.6 V) | <25 ppm $H_2O$ in Solvent | 0.1% $H_2O$ in Solvent | Solvent Exposed to Ambient Air 7 Days[a] | Cathode Exposed to Ambient Air 7 Days | Solvent & Cathode Exposed to Ambient Air |
|---|---|---|---|---|---|---|---|---|
| PC:DME:Diox (1:1:1) | | | | - | - | - | N/A | N/A |
| | X | | | $H_2$[b] | $H_2$, $CO_2$[b] | $H_2$, $CO_2$[b] | N/A | N/A |
| | | X | | $H_2$[b], $CO_2$[b] | 1/1[c] | 1.7/1[c], Org | 1.2/1[c], Org | 2.0/1[c], Org |
| 1 M $LiAsF_6$ | X | X | | $H_2$[b] | 9.0/1[c] | 7.0/1[c] | 1.2/1[c] | 3.4/1[c] |
| | | | | N/A | N/A | N/A | N/A | N/A |
| PC:DME:THF (1:1:1) | | | | - | - | - | N/A | N/A |
| | X | | | $H_2$[b] | $H_2$ | $H_2$, $CO_2$[b] | N/A | N/A |
| | | X | | - | $H_2$[b],$CO_2$,Org. | $H_2$[b],$CO_2$,Org. | $H_2$[b],$CO_2$,Org. | $H_2$[b],$CO_2$,Org. |
| 1 M $LiAsF_6$ | X | X | | $H_2$[b] | $H_2$ | $H_2$, $CO_2$[b] | 0.7/1[c], Org | 2.3/1[c], Org |
| | | | | N/A | N/A | N/A | N/A | N/A |
| PC | | | | - | - | - | N/A | N/A |
| | X | | | $H_2$[b] | $H_2$ | $H_2$ | N/A | N/A |
| | | X | | - | $H_2$[b],$CO_2$,Org. | $H_2$[b],$CO_2$,Org. | $H_2$[b],$CO_2$,Org. | $H_2$[b],$CO_2$,Org. |
| | X | X | | $H_2$[b] | $H_2$ | $H_2$ | 0.8/1[c], Org | 2.1/1[c], Org. |
| | | | | N/A | N/A | N/A | N/A | N/A |
| DME | | | | - | - | - | N/A | N/A |
| | X | | | $H_2$[b] | $H_2$ | $H_2$ | N/A | N/A |
| | | X | | - | - | Org. | - | Org. |
| | X | X | | $H_2$[b] | $H_2$ | $H_2$ | $H_2$[b] | $H_2$, Org. |
| | | | | N/A | N/A | N/A | N/A | N/A |
| Diox | | | | - | - | - | N/A | N/A |
| | X | | | $H_2$[b] | $H_2$, $CO_2$[b] | $H_2$, $CO_2$[b] | N/A | N/A |
| | | X | | - | 1.3/1[c] | 1.9/1[c] | 1/1 | 2.1/1[c] |
| | X | X | | $H_2$[b] | 5.2/1[c] | 5.5/1[c], Org. | 1.1/1 | 3.7/1[c], Org. |
| | | | | N/A | N/A | N/A | N/A | N/A |
| THF | | | | - | - | - | N/A | N/A |
| | X | | | $H_2$[b] | $H_2$ | $H_2$ | N/A | N/A |
| | | X | | - | - | - | - | - |
| | X | X | | $H_2$[b] | $H_2$ | $H_2$ | $H_2$[b] | $H_2$ |
| | | | | N/A | N/A | N/A | N/A | N/A | notes:  a: Positive test result for the presence of peroxides and 1000 to 3000 ppm $H_2O$ in solvent
b: Trace amounts detected in gas above cell
c: Ratio of $H_2$ to $CO_2$ detected in gas above cell
Org.: Trace amounts of light organic compounds detected in gas above cell

PREVENTION OF POLYMERIZATION IN LI/ MNO₂ ORGANIC ELECTROLYTE ELECTROCHEMICAL SYSTEMS

GOVERNMENT INTEREST

The invention described herein may be manufactured, used, imported, sold, and licensed by or for the Government of the United States of America without the payment to me of any royalty thereon.

FIELD OF THE INVENTION

The present invention relates generally to the field of lithium batteries, and more particularly to providing reducing agents that prevent gas formation and electrolyte polymerization in lithium organic manganese dioxide electrochemical cells.

BACKGROUND OF THE INVENTION

Portable batteries with increased energy and power densities are required as the use of portable electronic equipment by the military and civilians continues to rapidly increase. Additionally, these batteries must operate safely in all environments. Presently most military applications use the primary lithium/sulfur dioxide electrochemical system introduced to the field in the early 1980's, which provide significant increases in capacity, rate and low temperature operation capability. Although the lithium/sulfur dioxide system has served its purpose well, today's needs for portable electric power require that such primary batteries contain more energy and more power, as well as matching or surpassing the safety of current batteries. The lithium/ manganese dioxide (Li/MnO₂) electrochemical system may become the future primary battery in numerous military and civilian applications.

In fabricating lithium organic electrolyte manganese dioxide cells, the pouch cell is a significant manufacturing technique that removes the constraints of metal cylindrical cans from battery design by housing the active battery materials in a flat, light weight pouch that can take on any shape or size. However, the pouch cell imposes a number of difficulties on battery chemistry. For example, properties like electrolyte vapor pressure and electrode expansion on discharge became more important in the pouch cell because the metal can no longer contains pressure within the cell. After assembly, the lithium organic electrolyte manganese dioxide tends to become gassy and can vent unhealthy internal components to the user. When these pouch cells are discharged immediately after fabrication, the dangerous gases no longer seem to form. However, even a pre-discharged lithium organic electrolyte manganese dioxide pouch cell can exhibit gassing. Also, the cells show signs of electrolyte polymerization, which can occur in a few days or after the pouch cells are stored.

Several techniques have evolved to overcome the problems of gas formation and electrolyte polymerization in lithium organic electrolyte manganese dioxide (Li/MnO₂) pouch cell production. One method for eliminating gas formation in the cell is to discharge the pouch cell immediately after assembly, but this technique suffers from the disadvantage of removing about ten percent of the cell's total capacity. It has also been found that residual water within cell components is responsible for electrolyte decomposition producing gasses and the formation of alcohols. When cyclic carbonates, such as propylene carbonate, are used in fabricating Li/MnO₂ cells, the alcohol formed in the decomposition of the electrolyte is a dialcohol that can polymerize the electrolyte. This electrolyte polymerization reduces cell performance and can make the cell unusable. Though problems such as electrolyte side reaction were first observed in connection with Li/MnO₂ pouch cells, these shortcomings and limitations are not limited to pouch cells.

The current manufacturing process of cell discharge shortly after cell completion is ineffective, because even though discharge usually eliminates the gassing problem, polymerization is still often observed after cell storage. Moreover, when Li/MnO₂ cells are discharged immediately after manufacturing, that discharge removes about ten percent of the capacity of the cell and lowers the open circuit voltage of the system from 3.6 to under 3.2 volts. Thus there has been a long-felt need to address the degradation of the electrolyte in Li/MnO₂ and other lithium cells and focus on the chemical mechanism causing electrolyte decomposition and resulting in gas formation and electrolyte polymerization in Li/MnO₂ and other lithium cells, without engaging in costly post-manufacture discharge. The reducing agents of the present invention eliminate the disadvantages of gassing and polymerization due to electrolyte decomposition and thus, increase production efficiency for lithium organic electrolyte manganese dioxide cells.

In order to overcome the long-felt problems of gas formation and polymerization in Li/MnO₂ and lithium cells, the present invention provides a reducing agent for polymerized lithium organic electrolyte electrochemical systems. The present invention comprises adding a phosphorous or arsenic reducing agent to the Li/MnO₂ and other lithium battery electrolyte that generates ether and certain acids, which prevents both gas formation and electrolyte polymerization caused by the formation of dialcohol.

SUMMARY OF THE INVENTION

It is an object of the present invention to provide a phosphorous reducing agent to eliminate gas formation and polymerization of Li/MnO₂ and other lithium cells caused by the formation of dialcohol.

Another object of the present invention is to provide a phosphorous reducing agent to the Li/MnO₂ battery electrolyte causing the phosphorous compound and alcohol to react and produce ether and orthophosphorous acid, which prevents gas formation and the polymerization of Li/MnO₂ cells caused by the formation of dialcohol.

It is still another object of the present invention is to provide an arsenic reducing agent to the Li/MnO₂ and other lithium battery electrolyte causing the arsenic compound and alcohol to react and produce ether and orthoarsenic acid, which prevents gas formation and the polymerization of L/MnO₂ cells caused by the formation of dialcohol.

These and other objects are advantageously accomplished with the phosphoric reducing agent of the present invention, comprising a reducing agent with the general formula $P(OR)_3$ where $R=CH_3CH_2$, $CH_3$, $(CH_3)_2CH$) being added to a Li/MnO₂ battery electrolyte, causing a reaction between the reducing agent and alcohol that produces ether and orthophosphorous acid. The ether and orthophosphorous acid produced by this reaction prevent gas formation and the polymerization caused by the formation of dialcohol in the Li/MnO₂ cells. The preferred embodiment of the present invention is a phosphoric acid tri-ester. Further, other phosphorous compounds cause the necessary reaction between the phosphate compound and alcohol to produce ether and orthophosphorous acid compounds. Other useful reducing compounds that provide the same reactions and similar effects include arsenic (As) and halogenated hydrocarbons such as fluorine, chlorine, bromine and iodine, as well as phosphoric acid tri-ester, phosphorous tri-fluoride, phosphorous tri-chloride, phosphorous tri-bromide, phosphorous tri-iodide, arsenic acid tri-ester, arsenic tri-fluoride, arsenic tri-chloride, arsenic tri-bromide and arsenic tri-iodide.

BRIEF DESCRIPTION OF THE DRAWINGS

Table 1 depicts the chemical structures of tetradydrafuran (THF), dioxolane (Diox), dimethoxyethane (DME), and propylene carbonate (PC) solvents;

Table 2 is a chart showing the relative concentration of $H_2$ and $CO_2$ in the headspace above the cell 24 hours after fabrication;

Figure 1:
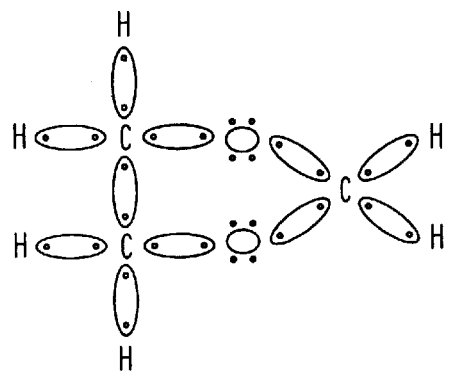
Figure 2:
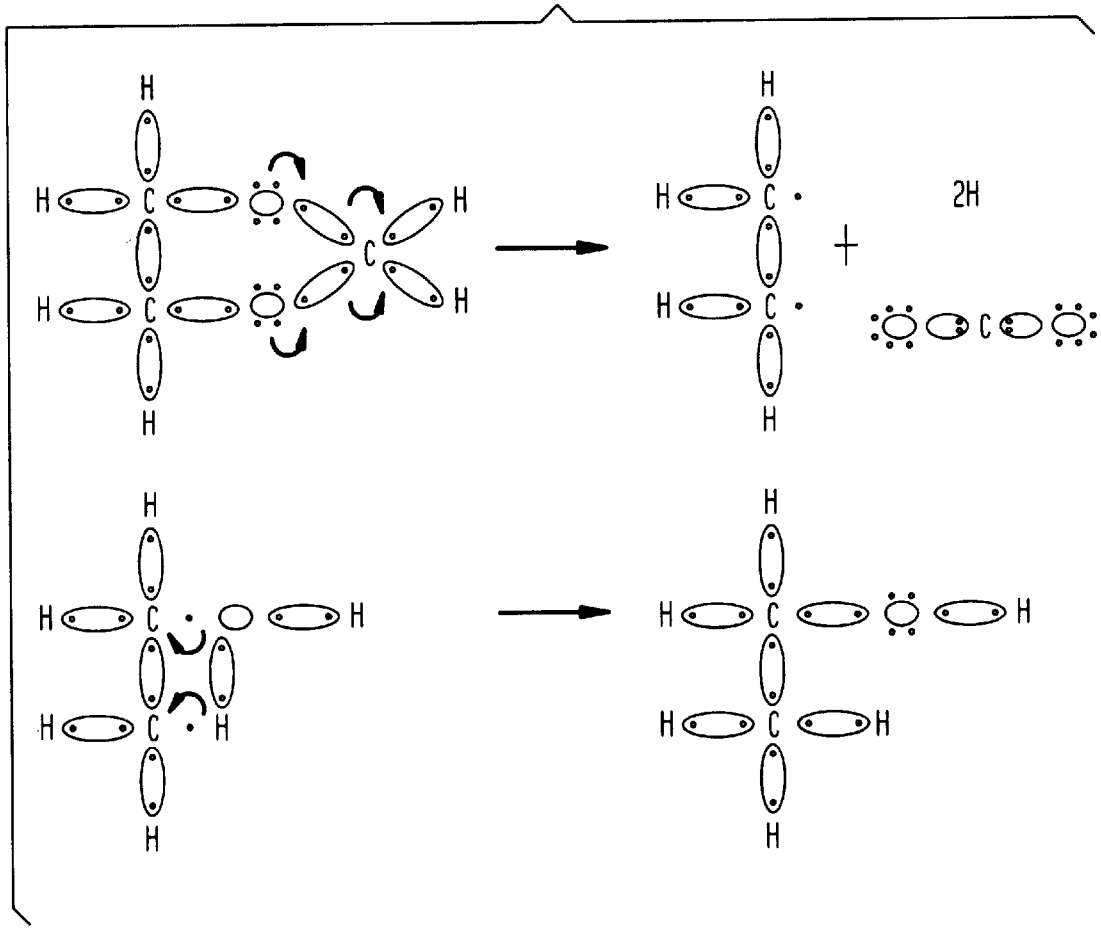
Figure 3:
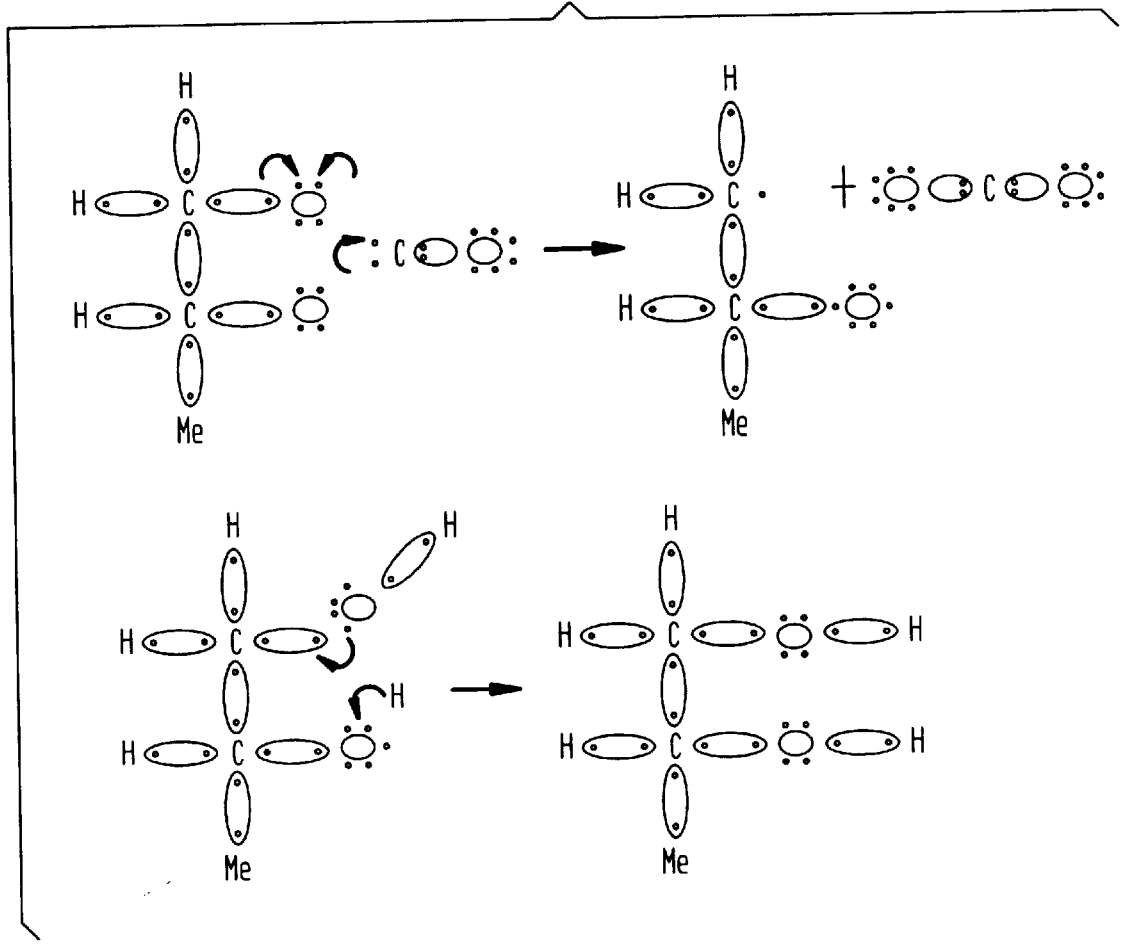
Figure 4:
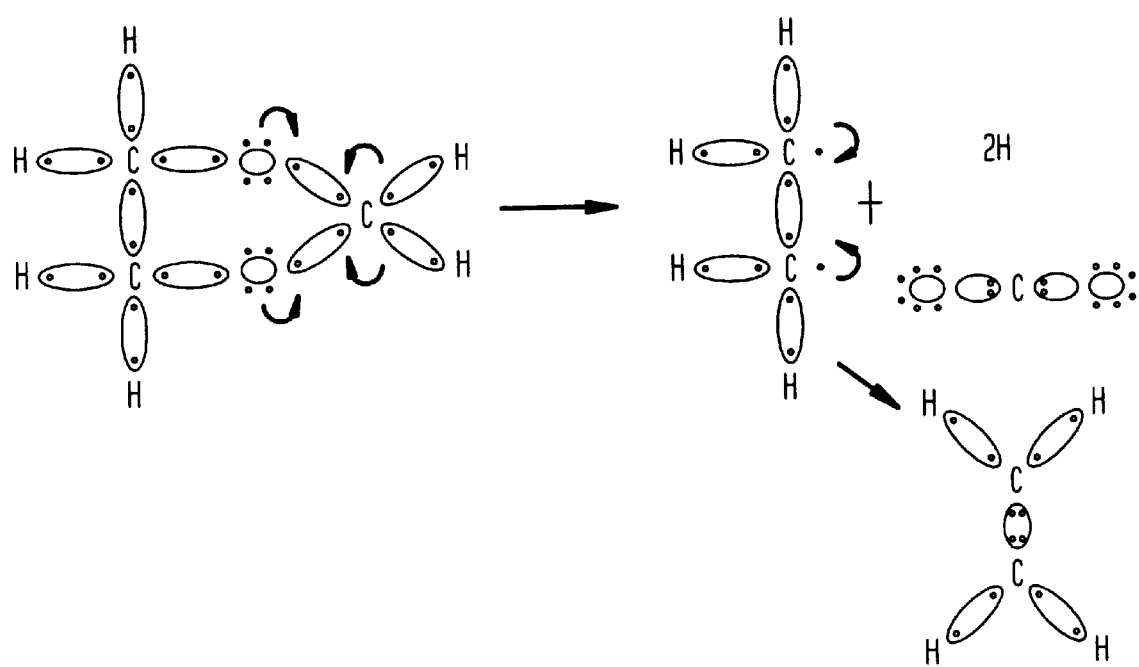
Figure 5:
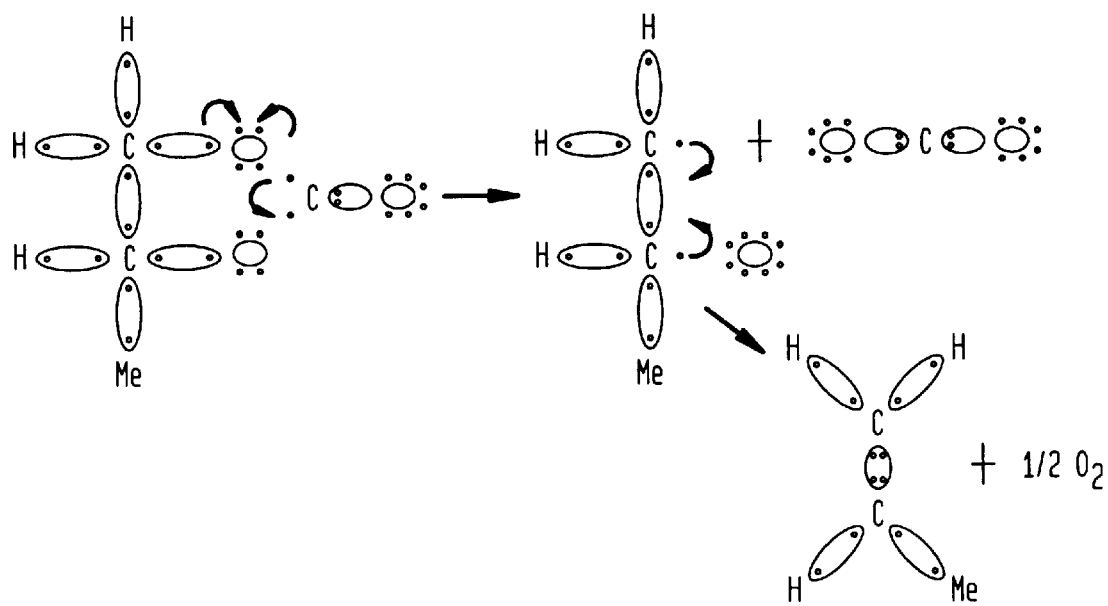
Figure 6:
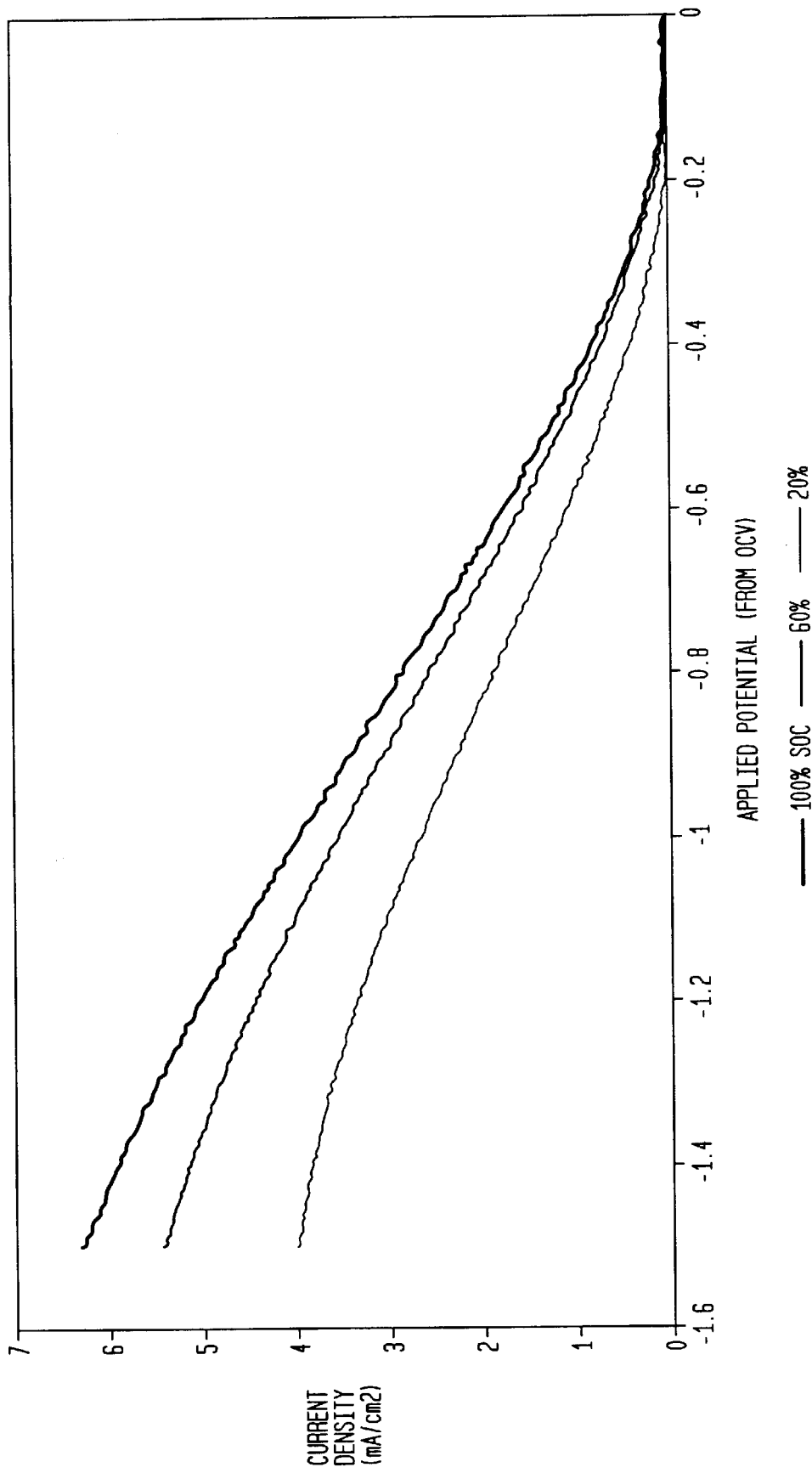
Figure 7:
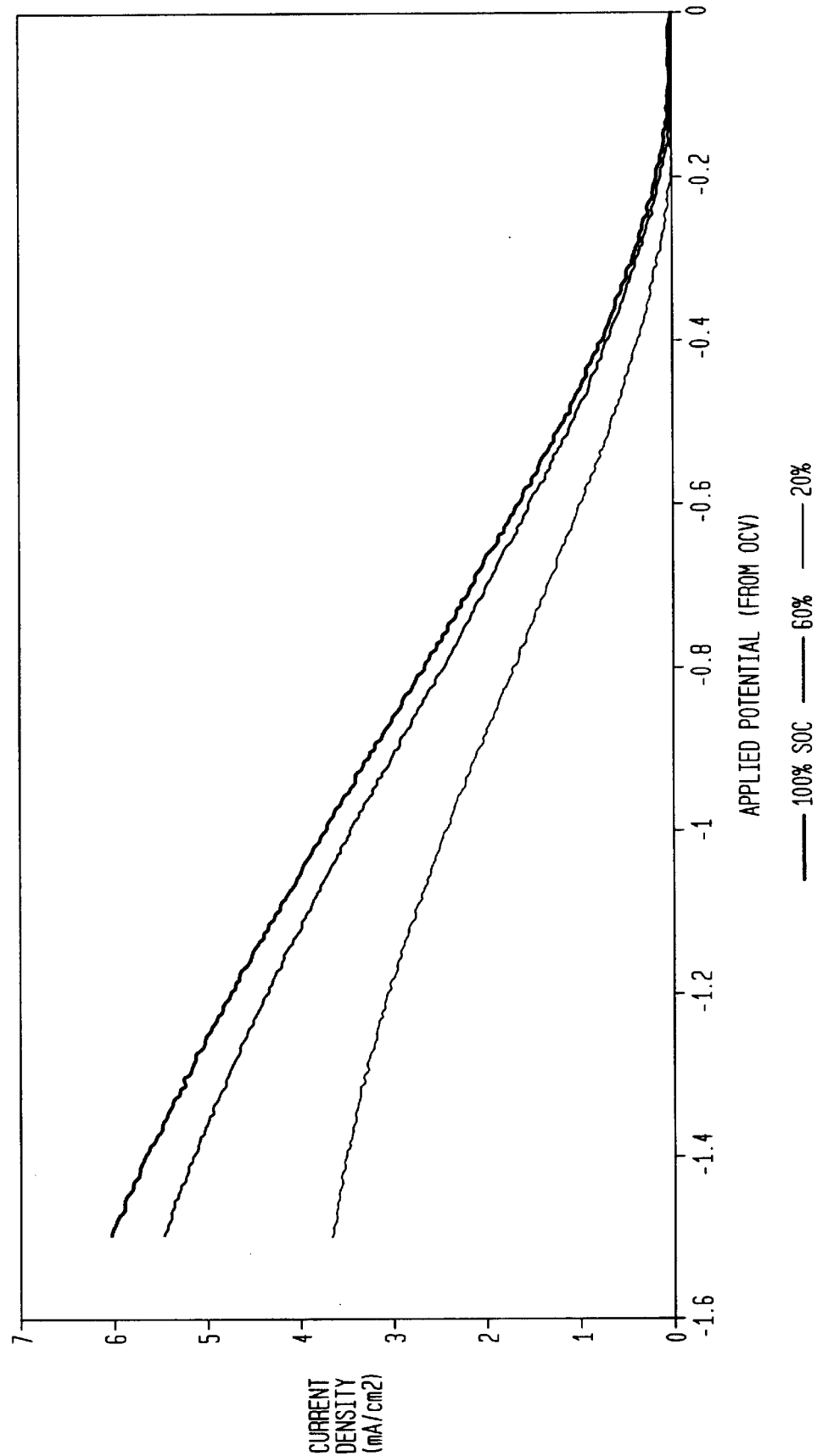
Figure 8:
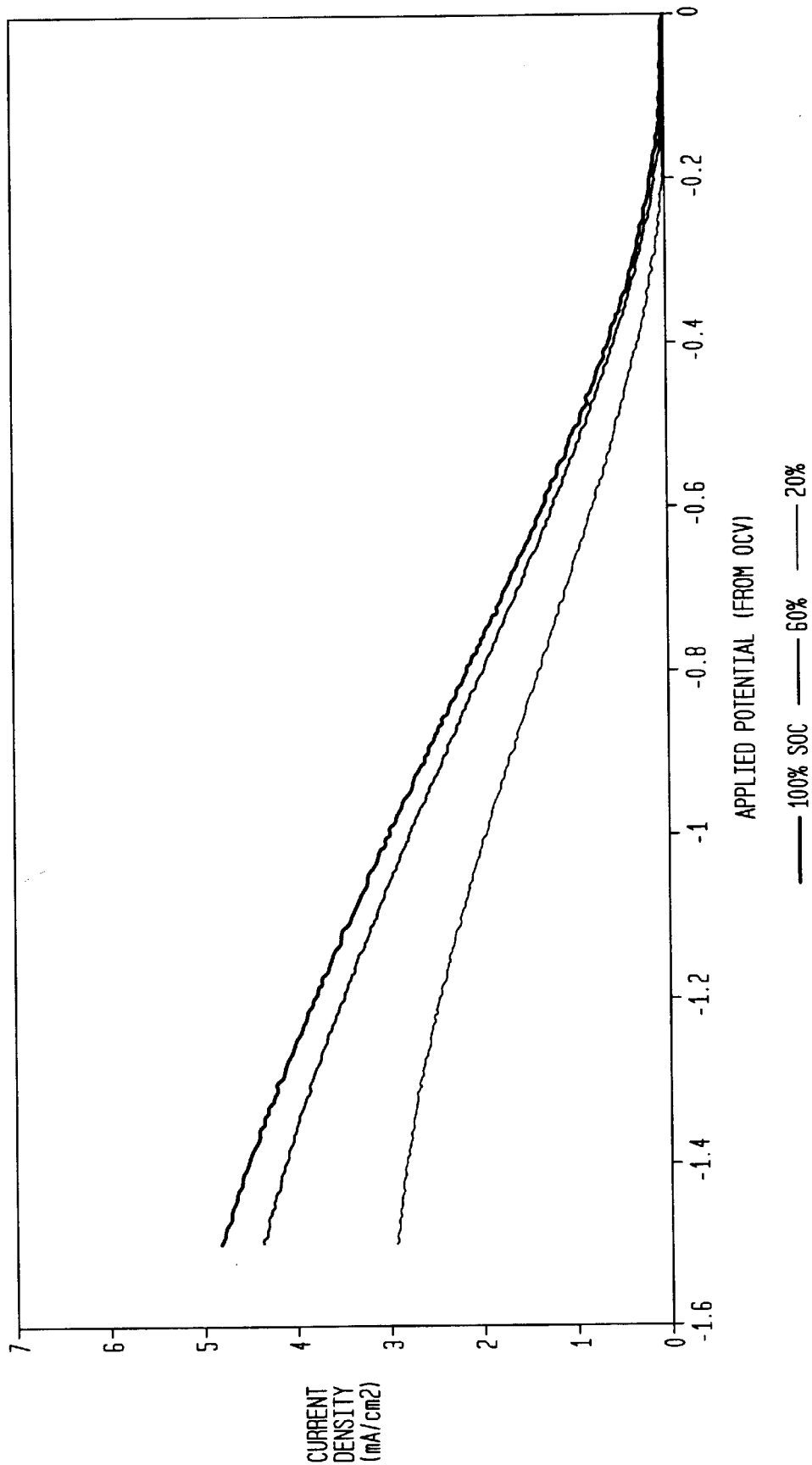
Figure 9:
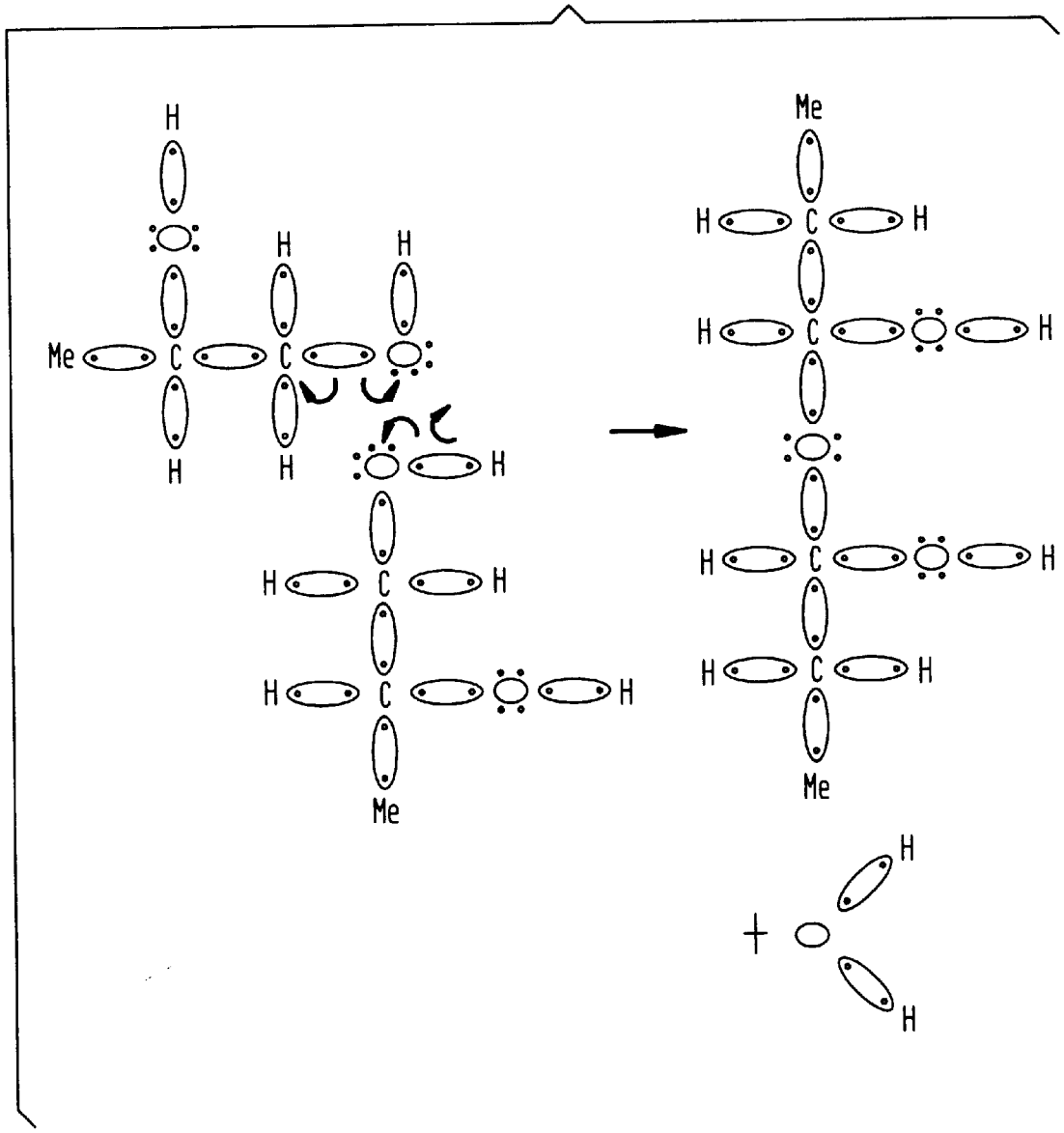

Table 3 is a chart showing the relative concentration of $H_2$ and $CO_2$ in the headspace above the cell 1 month after fabrication;

Table 4 is a chart showing the relative concentration of $H_2$ and $CO_2$ in the headspace above the cell 4 months after fabrication;

FIG. 1 depicts the dioxolane molecule with elliptical bonds and valence electrons;

FIG. 2 depicts the reaction between dioxolane and water;

FIG. 3 depicts the reaction between propylene carbonate and water to produce alcohol;

FIG. 4 depicts the auto-oxidation reduction of dioxolane;

FIG. 5 depicts the auto-oxidation reduction of propylene carbonate;

FIG. 6 is a chart showing decrease in rate capability of cell containing an electrolyte comprised of 1.0 molar $LiAsF_6$ after 24 hours storage;

FIG. 7 is a chart showing decrease in rate capability of cell containing an electrolyte comprised of 1.0 molar $LiAsF_6$ after 1 month of storage;

FIG. 8 is a chart showing decrease in rate capability of cell containing an electrolyte comprised of 1.0 molar $LiAsF_6$ after 4 months storage; and FIG. 9 depicts the polymerization reaction of 1,2 propanediol through a condensation polymerization reaction, producing the reducing agents of the present invention.

DETAILED DESCRIPTION OF THE DRAWINGS

The present inventors have formulated a number of advantageous phosphoric compounds as reducing agents to provide cost-effective $Li/MnO_2$ battery cells that do not suffer from the long-standing disadvantages, shortcomings and limitations of gas formation and electrolyte polymerization. This invention's phosphorous reducing agents comprise phosphate compounds having the general formula $(P(OR)_3$ where $R=CH_3CH_2$, $CH_3$, $(CH_3)_2CH)$ being added to a $Li/MnO_2$ and other lithium electrolytes, that cause a reaction between the phosphate compound and alcohol that produces ether and orthophosphorous acid. The ether and orthophosphorous acid produced by this reaction prevent gas formation and the polymerization caused by the formation of dialcohol in the $LiMnO_2$ cells. The reducing agents of the present invention are phosphoric acid tri-ester, which is the preferred embodiment, as well as arsenic (As) and halogenated hydrocarbons such as fluorine, chlorine, bromine and iodine which can be substituted for OR in the general formula $P(OR)_3$.

Before describing the present invention's reducing agent in detail, the chemical mechanisms that lead to electrolyte decomposition and the resulting gas formation and electrolyte polymerization will be described in detail. The typical organic solvents used in $Li/MnO_2$ pouch cell systems include: tetradydrafuran (THF), dioxolane (Diox), dimethoxyethane (DME), and propylene carbonate (PC). Table 1 depicts the chemical structures of these solvents. These solvents are mixed with a lithium salt to aid in ionic conductivity, and $LiClO_4$, $LiAsF_6$ and $LiPF_6$ are examples of salts typically used in lithium organic electrolyte electrochemical cells. Until now, gas generation in $Li/MnO_2$ has been attributed to oxidation of the solvent in the presence of an electrochemical potential. However, this explanation did not account for all observed cases of gassing in cells that have been previously discharged reducing the cell voltage. The present inventors theorized that isolating the reactants in the decomposition reaction would provide a better explanation, by reducing the complexity of the electrochemical system. Propylene carbonate and dioxolane will be used to illustrate the chemical mechanisms due to the reactive behavior observed in the isolated experiments.

To isolate the reactants in the decomposition process, experimental Teflon $Li/MnO_2$ button cells were made and tested. The Teflon $Li/MnO_2$ button cells were two Teflon plates with machined 2.48 $cm^2$ cylindrical recesses prepared with and without an anode or cathode. The cell electrolytes were either a pure solvent or proportional mixtures of the PC, DME, Diox or THF solvents depicted in Table 1. Water was then introduced into the solvents either directly or through exposure to ambient air. The experimental cells were composed of a lithium anode separated from a Teflon bonded cathode with a nonwoven poly-propylene separator. The cathode was fabricated by mixing together $MnO_2$, carbon and Teflon in a 6:3:1 ratio respectively. The finished cell was a flooded electrolyte design.

Each button cell was placed in an argon-filled reaction vessel to collect the gaseous reaction products. 100 ul gas samples were introduced into a HP6890 gas chromatograph after 1, 5 and 8 hours, 1, 3, 7 and 14 days and 1, 2 and 4 months. An additional test was to apply a 3.6 Volt bias on the cell. After 28 days, samples of electrolyte were analyzed using wet chemical analysis techniques and gas chromatography. Sample cells from the population were reserved for electrical testing as well as postmortem examination. For comparison to the controlled solvent study, gas and electrolyte samples from manufactured $Li/MnO_2$ cells were analyzed in parallel.

This experiment showed that the predominant gas in the headspace above the cell was $H_2$ and $CO_2$, and trace amounts of the solvent were also present. Additionally, trace amounts of light organic compounds, including methane, methanol and ethanol, were also present in the headspace above some samples.

Tables 2–4 show the relative concentration of $H_2$ and $CO_2$ in the headspace above the cell 24 hours, 1 month and 4 months, respectively, after the cell was fabricated. These tables also indicate the presence of light organic compounds in the gases above the cell. For example, Table 2 shows that in the button cell with 1 mole $LiAsF_6$ with a PC:DME:Diox solvent mixture of in a 1:1:1 ratio hydrogen is the predominant gaseous reaction product species in the head space gas sample after 24 hours when lithium is present in the cell and the source of water is from the electrolyte. This holds true with little change in the relative concentrations after 1 and 4 months of storage as shown in Tables 3 and 4. Hydrogen is produced when water reacts with lithium forming lithium hydroxide and hydrogen. When the source of water is the cathode, the cathode exposed to ambient air for 7 days, the concentration of carbon dioxide increases. This increase is such that the concentrations of hydrogen and carbon dioxide are comparable. Carbon dioxide is produced when water reacts with the electrolyte.

Table 2 also shows that in the button cell with 1 mole $LiAsF_6$ with a PC:DME:THF solvent mixture of in a 1:1:1 ratio hydrogen is the predominant gaseous reaction product species in the headspace gas sample after 24 hours when lithium is present in the cell and the source of water is from the electrolyte. This holds true with little change in the relative concentrations after 1 and 4 months of storage as shown in Tables 3 and 4. When the source of water is the cathode, the cathode exposed to ambient air for 7 days, the concentration of carbon dioxide increases. This increase is such that the concentration of carbon dioxide is predominant. Table 2 shows that there are no gaseous products after 24 hours and Tables 3 and 4 show that carbon dioxide are formed after storage for 1 month.

Further examination of Tables 2–4 shows that for DME and THF single solvent electrolyte samples, hydrogen is the only gaseous product. Additionally for cells with DME and THF, hydrogen gas was detected only when lithium was present. Tables 2–4 show that in Diox single solvent cells, carbon dioxide and hydrogen are present in the gaseous headspace of the cell. Tables 2–4 show for PC single solvent cells that hydrogen is produced when lithium is present and the source of water is from the electrolyte and carbon dioxide is produced when the cathode is the source of water. Table 2 shows that carbon dioxide is not present after 24 hours and Tables 3 and 4 show the presence of carbon dioxide after prolonged storage. This demonstrates that the reaction between water and lithium is favored resulting in the production of lithium hydroxide and hydrogen. However, when the water is contained in the cathode it is not available for the reaction with lithium and electrolyte decomposition occurs. Tables 24 also indicate that both DME and THF are relatively unaffected by the introduction of water into the cell. Trace amounts of hydrogen detected in head space samples for pure DME and THF samples. The presence of carbon dioxide in the pure PC and Diox samples show the reaction between these component solvents and water.

When the predominant gas in the headspace was $H_2$ only, such as Table 2, sixth and seventh columns in the DME solvent, gas was detected 1 hour after assembly. However, when both $H_2$ and $CO_2$ were present in significant quantities, as for example in Table 2, PC;DME;Diox (1:1:1) 1 mole $LiAsF_6$, gases were detected 5 hours after assembly. That finding indicates a time delay for the electrolyte decomposition reaction. Further, light organic compounds were detected after 24 hours. The concentrations of the gases generated did not vary significantly after 24 hours.

Tables 2–4 demonstrate that when only a "dry" solvent, i.e. no water content, was present in the sample, the test cell did not generate any significant amounts of gas. When the gas detected was primarily $H_2$, the test sample contained lithium and a "wet" solvent. $CO_2$ was detected when the electrolyte contained dioxolane or propylene carbonate and $MnO_2$ was present in the cell. The data in Tables 2–4 also shows that if the cathode is the source of water, the relative amount of $CO_2$ increases. Wet chemical analysis showed the presence of hydroxide in the electrolyte of samples that $H_2$ was the predominant gas generated.

Based on this data, the inventors theorize that three chemical reactions take place within the Li/$MnO_2$ and other lithium cells that generate gaseous products. Knowing and understanding these reactions also indicated a number of potential solutions to the long-standing problems associated with gas formation and electrolyte polymerization in Li/$MnO_2$ cells. The first is the reaction of water in the electrolyte and the lithium anode. The second reaction producing $H_2$ and $CO_2$ requires dioxolane, water and $MnO_2$ to be present. The third reaction producing $CO_2$ requires propylene carbonate, water and $MnO_2$ to be present. The data also indicates that the lithium/water reaction is favored over the dioxolane/water reaction then the propylene carbonate/water reaction. However, when the water is entrapped in the cathode only the dioxolane/water and propylene carbonate/water reaction can occur. This is due to the water entrapped in the cathode is not available to the lithium for the lithium/water reaction. Referring now to the drawings, FIG. 1 shows the dioxolane molecule with elliptical bonds and valence electrons. Each structure will be shown with all of valence electrons, and those electrons shared between two atoms will be shown as elliptical bonds to better illustrate these chemical mechanisms.

Based on this experiment, chemical mechanisms releasing hydrogen and carbon dioxide provide the best potential solutions to the long-standing problems associated with gas formation and electrolyte polymerization in Li/$MnO_2$ and other lithium cells. These chemical mechanisms will then be compared to the above experimental results. FIG. 2 shows the reaction between dioxolane and water to produce alcohol. In this reaction, hydrogen and carbon dioxide gases are released along with the formation of ethanol. In the reaction shown in FIG. 3, which shows the reaction between propylene carbonate and water to produce dialcohol, carbon dioxide is released along with the formation of 1,2 propanediol. The data also shows that $MnO_2$ acts as a catalyst for this reaction, since the reaction does not take place in the pure electrolyte samples.

FIG. 4 depicts the auto-oxidation reduction of dioxolane and FIG. 5 depicts the auto-oxidation reduction of propylene carbonate. Light or another energy source such as an electrochemical potential could initiate these chemical mechanisms. In these mechanisms, $H_2$ and $CO_2$ are released along with ethylene for dioxolane and propylene and oxygen for propylene carbonate as reaction products. Using gas chromatography neither ethylene nor propylene was detected in the experimental samples. By comparing the results of the experiment and the data recorded on Tables 2–4, it is clear that the chemical mechanism depicted in FIGS. 3 and 9 would satisfy all observations of electrolyte decomposition and polymerization. Introducing the $P(OR)_3$ reducing agent of the present invention into the electrolyte will retard and terminate the polymerization reaction.

Electrical testing of sample cells showed a decrease in rate capability on the test cells after storage. FIGS. 6–8 are charts showing decrease in rate capability of a cell containing an electrolyte comprised of 1.0 molar $LiAsF_6$ in 1:1:1 PC:DME:THF after 24 hours, 1 month and 4 months storage, respectively. Comparisons of these figures show the decrease of rate capability of the cells. Additionally, disassembled test cells revealed a gelled electrolyte, which indicates a polymerization of the electrolyte, as shown in FIG. 9. Similar results were also observed when 1:1:1 PC:DME:Diox electrolyte was used.

FIG. 9 depicts the polymerization reaction of 1,2 propanediol through a condensation polymerization reaction. The decomposition reaction shown involving the presence of water, and $MnO_2$ with the generation of alcohols best matches laboratory results and analysis of manufactured cells evaluated shortly after assembly. Thus, the FIG. 9 reaction explains gas formation and electrolyte polymerization in Li/MnO$_2$ and other lithium battery cells. After a Li/MnO$_2$ battery cell is stored, the decomposition products of propylene carbonate, shown in FIG. 3, undergo condensation polymerization "gelling" the electrolyte, as shown in FIG. 9, thus reducing the rate capability of the cell. It has been found that residual water within cell components is responsible for electrolyte decomposition producing gasses and the formation of alcohols. Based upon the FIG. 9 chemical mechanism and the experiments conducted, the reducing agent needs to terminate the polymerization reaction.

Experimental cells with 0.5 weight percent P(OCH$_2$CH$_3$)$_3$ added to the electrolyte were fabricated and stored. The cell electrolyte was proportional mixtures of PC, DME and THF. Water was then introduced into the cell through exposure to ambient air. The experimental cells were composed of a lithium anode separated from a Teflon bonded cathode with a non-woven poly-propylene separator. The cathode was fabricated by mixing together MnO$_2$, carbon and Teflon in a 6:3:1 ratio respectively. The finished cell was a flooded electrolyte design. During electrochemical experiments, cells with the 0.5 weight percent added P(OCH$_2$CH$_3$)$_3$ performed similarly to baseline "dry" cells.

When cyclic carbonates such as propylene carbonate are used in the electrolyte, the alcohol formed in the decomposition is a dialcohol, as shown in FIG. 3, which under certain conditions readily undergoes polymerization. This polymerization of the electrolyte reduces cell performance and may render the cell unusable.

In accordance with the present invention, adding certain phosphate III compounds inhibits the electrolyte polymerization. The addition of phosphorous III compounds in the form of a phosphoric acid tri-ester (P(OR)$_3$ where R=CH$_3$CH$_2$, CH$_3$, (CH$_3$)$_2$CH) to the electrolyte of lithium organic electrolyte manganese dioxide (Li/MnO$_2$) cells reduced the amount of electrolyte gelling. The reaction between the phosphorous tri-ester and alcohol produces an ether and orthophosphorus acid. This reaction is shown in Equation 1.

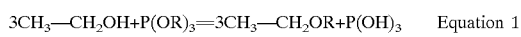

3CH$_3$—CH$_2$OH+P(OR)$_3$=3CH$_3$—CH$_2$OR+P(OH)$_3$     Equation 1

In this reaction, arsenic (As) could be substituted for phosphorous (P). The driving force for this reaction is the affinity of phosphorous for oxygen. The phosphorous tri-ester reacts directly with water present in the cell. The reaction between the phosphorous tri-ester and water produces an alcohol and orthophosphorus acid. This reaction is shown in Equation 2. The alcohol then will react further as described in Equation 1.

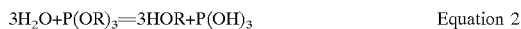

3H$_2$O+P(OR)$_3$=3HOR+P(OH)$_3$     Equation 2

A number of variations of the present invention are possible. For example, other reducing compounds that yield ethers or halogenated hydrocarbons could be used. In the case of halogens fluorine, chlorine, bromine or iodine can be substituted for OR in equation 1 and 2 above. In the case of ethers, P(OR)$_5$ can be substituted for P(OR)$_3$ in equations 1 and 2 above. Variations in the mixtures will also impact the reducing agent's effectiveness.

Further, other phosphorous compounds cause the necessary reaction between the phosphate compound and alcohol to produce ether and orthophosphorous acid compounds. Other useful reducing compounds that provide the same reactions and similar effects include arsenic (As) and halogenated hydrocarbons such as fluorine, chlorine, bromine and iodine, as well as phosphoric acid tri-ester, phosphorous tri-fluoride, phosphorous tri-chloride, phosphorous tri-bromide, phosphorous tri-iodide, arsenic acid tri-ester, arsenic tri-fluoride, arsenic tri-chloride, arsenic tri-bromide and arsenic tri-iodide. Other variations within the contemplation of this invention include variations in the organic electrolyte containing water, generating a decreased amount of gel, using an Li/MnO$_2$ electrolyte, electrochemical system, battery and pouch cell, as well as a lithium ion electrolyte, electrochemical system, battery and pouch cell. The present invention also provides for a reducing agent comprising a phosphorous compound generating ether in the presence of the alcohol compound, which is added to the electrolyte like the other compounds.

Additionally, while several embodiments have been illustrated and described, it will be obvious to those skilled in the art that various modifications may be made without departing from the spirit and scope of this invention.

What we claim is:

1. A reducing agent for a lithium organic electrolyte electrochemical system, comprising:
   an arsenic III compound having the general formula As(OR)$_3$ where R=CH$_3$CH$_2$, CH$_3$, (CH$_3$)$_2$CH being added to an organic electrolyte;
   said electrolyte containing a mixture of ether, carbonates, H$_2$O and alcohol impurities that releases H$_2$ and CO$_2$ to form alcohol in the presence of said H$_2$O; and
   said arsenic III compound generating ether and orthoarsenic acid in the presence of said alcohol prevents polymerization caused by the electrolyte forming dialcohol as a result of said H2O and said alcohol impurities.

2. The reducing agent for the lithium organic electrolyte electrochemical system, as recited in claim 1, further comprising said ether and said orthoarsenic acid preventing gas formation in said electrochemical system.

3. The reducing agent for the lithium organic electrolyte electrochemical system, as recited in claim 2, further comprising said organic electrolyte containing water.

4. The reducing agent for the lithium organic electrolyte electrochemical system, as recited in claim 3, further comprising said electrolyte being a Li/MnO$_2$ electrolyte.

5. The reducing agent for the lithium organic electrolyte electrochemical system, as recited in claim 4, wherein the lithium organic electrochemical system is a Li/MnO$_2$ electrochemical system.

6. The reducing agent for the lithium organic electrolyte electrochemical system, as recited in claim 5, further comprising said LiMnO$_2$ electrochemical system is a Li/MnO$_2$ battery.

7. The reducing agent for the lithium organic electrolyte electrochemical system, as recited in claim 6, further comprising said Li/MnO$_2$ battery being a pouch cell.

8. The reducing agent for the lithium organic electrolyte electrochemical system, as recited in claim 7, further comprising adding said reducing agent to said electrolyte before packaging said pouch cell.

9. The reducing agent for the lithium organic electrolyte electrochemical system, as recited in claim 3, further comprising said electrolyte being a lithium ion electrolyte.

10. The reducing agent for the lithium organic electrolyte electrochemical system, as recited in claim 9, wherein the lithium organic electrochemical system is a lithium ion electrochemical system.

11. The reducing agent for the lithium organic electrolyte electrochemical system, as recited in claim 10, further comprising said lithium ion electrochemical system is a lithium ion battery.

12. The reducing agent for the lithium organic electrolyte electrochemical system, as recited in claim 11, further comprising said lithium ion battery being a pouch cell.

13. The reducing agent for the lithium organic electrolyte electrochemical system, as recited in claim 12, further comprising adding said reducing agent to said lithium ion electrolyte before packaging said pouch cell.

* * * * *